United States Patent [19]

Cheron et al.

[11] Patent Number: 5,440,010
[45] Date of Patent: Aug. 8, 1995

[54] GAS PHASE PROCESS FOR FORMING POLYKETONES

[75] Inventors: Teresa M. Cheron, Yonkers, N.Y.; Paul K. Hanna, East Windsor, N.J.; Claude B. Peterson, Middletown, N.Y.

[73] Assignee: Akzo Nobel N.V., Arnhem, Netherlands

[21] Appl. No.: 268,071

[22] Filed: Jun. 27, 1994

[51] Int. Cl.⁶ .............................................. C08G 67/02
[52] U.S. Cl. ..................................... 528/392; 528/271
[58] Field of Search ............................... 528/271, 392

[56] References Cited

U.S. PATENT DOCUMENTS

| | | | |
|---|---|---|---|
| 3,694,412 | 9/1972 | Nozaki | 260/63 CQ |
| 4,778,876 | 10/1988 | Doyle et al. | 528/392 |
| 4,940,776 | 7/1990 | Bakkum et al. | 528/392 |
| 4,948,870 | 8/1990 | Van Doorn et al. | 528/392 |
| 5,331,083 | 7/1994 | Hanna et al. | 528/392 |

FOREIGN PATENT DOCUMENTS 9325602  12/1993  WIPO ........................... C08G 67/02

*Primary Examiner*—Melvyn I. Marquis
*Assistant Examiner*—Shelley A. Dodson
*Attorney, Agent, or Firm*—Richard P. Fennelly; Louis A. Morris

[57] ABSTRACT

Polyketones can be formed in enhanced yield by conducting the polymerization of the carbon monoxide and olefin monomers used to form the polyketone in a gas phase polymerization process in the presence of a polyketone catalyst support which is substantially saturated with an amount of a liquid, non-polymerizable diluent which is effective in increasing the amount of polyketone formed over that which would be formed in the substantial absence of the diluent. The catalyst support which is substantially saturated with the liquid, non-polymerizable diluent is formed in a previous solution polymerization step in which the polyketone catalyst support is formed by polymerizing carbon monoxide and an olefin in the diluent comprising a catalyst so that the polymer which is formed adsorbs substantially all the diluent followed by continuation of the reaction substantially in the gas phase in the presence of the saturated polyketone catalyst support.

4 Claims, No Drawings

GAS PHASE PROCESS FOR FORMING POLYKETONES

BACKGROUND OF THE INVENTION

It is known to form polyketones by the polymerization of carbon monoxide and one or more olefins by a vapor phase polymerization process. For example, U.S. Pat. No. 4,778,876 of M. J. Doyle et al. describes such a process in which the monomers are contacted with the catalyst compositions in the substantial absence of a liquid, non-polymerizable diluent. Any small quantity of diluent that might be present is vaporized and present in exclusively the gaseous state during the polymerization (Col. 3, lines 35–40). This teaching of having any added alcohol diluent present exclusively or substantially in the gaseous condition during the polymerization reaction is substantially echoed by other, more recent patent references: European Patent Publication No. 248,483 (see Col. 3, lines 8–13 and Claim 2). European Patent Publication No. 443,587 (see Col. 3, lines 3–8 and Claim 2); and European Patent Publication No. 506,168 (see Col. 5, lines 29–35 and Claims 8–9).

Netherlands Patent Application No. 9101114, filed Jun. 27, 1991, and corresponding European Patent Publication No. 520,584 advocate a gas phase polymerization process for the manufacture of polyketones in which water is added to the polymerization reaction environment to enhance the polymerization activity of the polymerization process. The amount of water should range from more than one mole per gram atom of Group VIII metal in the catalyst, preferably more than 10 moles, for example, from about 5,000 to about 50,000 moles per mole of Group VIII metal. The upper limit of water added is set by the requirement that gas should form the continuous phase in the reactor. The European patent citation exemplifies the add-on of 1 ml and 7 ml water, respectively, to 8 g of porous carbon monoxide/ethene copolymer catalyst support. The present investigators have determined that a carbon monoxide/ethene copolymer becomes saturated at far higher levels of water add-on than 7 ml, namely, at about 40–43 g. The productivity using 7 ml of water (an add-on of about 88%) was inferior to that observed when a far lower add-on (14% for 1 ml of water) was employed.

In PCT International Patent Publication No. WO 93/25602 and related U.S. Pat. No. 5,331,083, a gas phase process for catalytically polymerizing carbon monoxide and at least one olefin to produce a polyketone is described. The particular improvement in the process of that particular invention was conducting the polymerization in the presence of a catalyst support which was substantially saturated with a liquid, non-polymerizable diluent which increased the amount of polyketone that was formed in the process. In one preferred embodiment of the process, a ketone, such as acetone, was used with the addition of hydrogen to yield a product of reduced molecular weight, increased bulk density, and increased thermal stability.

In the process shown in that patent publication, a quantity of catalyst was prepared and was dissolved in small amount of solvent forming a catalyst solution which was then sprayed onto a previously formed and isolated carbon monoxide/ethylene copolymer which had been wetted with a quantity of solvent (the "seed batch"). The polyketone-supported catalyst thereby produced was then placed into the reactor, the reactor was pressured with a mixture of carbon monoxide and olefin, such as ethylene, and stirring and heating of the reactor was begun to initiate the predominantly gas phase polymerization reaction.

SUMMARY OF THE PRESENT INVENTION

The present invention relates to a solution/gas phase process for catalytically polymerizing carbon monoxide and at least one olefin to produce a polyketone in which it is not necessary to previously form and then isolate a "seed batch" of the catalyst-impregnated polymer substrate via a slurry polymerization as described in the foregoing PCT patent publication. The particular improvement in the process of the present invention comprises conducting the polymerization in the presence of a catalyst support which has been substantially saturated with a liquid, non-polymerizable diluent to increase the amount of polyketone that is formed in the process, by conducting the first part of the polymerization in solution with just enough diluent to form the catalyst-impregnated polymeric support with the polymer adsorbing the diluent as it is being formed and then continuing the polymerization after the polymeric support has adsorbed substantially all of the liquid solvent in the reaction medium utilizing a predominantly gas phase polymerization containing the polyketone polymer support which has become saturated with the catalyst solution from the previous step.

DETAILED DESCRIPTION OF THE PRESENT INVENTION

The initial portion of the instant polymerization reaction uses a solution polymerization reaction in which carbon monoxide and one or more selected olefin(s), such as ethylene, are polymerized to form a polyketone product which becomes saturated with the diluent used in the polymerization reaction as well as the catalyst used in the polymerization reaction as the reaction proceeds. Generally speaking, the amount of diluent used in this phase of the instant reaction will be substantially lower than the amount used in conventional solution phase polymerizations of carbon monoxide and one or more olefins in which the liquid diluent is to be present throughout the entire polymerization reaction as a solution phase. Generally, the amount of diluent used in such solution polymerization reactions will be at least 200,000%, by weight of the catalyst with higher activity catalysts requiring higher amounts of diluent. In optimized systems, the amount of diluent will be far higher than the foregoing minimum amount. In the instant process, the amount of diluent will generally range from about 1,000% to about 50,000%, by weight of the catalyst. The monomers chosen for use in connection with the present invention can be polymerized into high molecular weight linear alternating polymers of carbon monoxide and the olefin or olefins that are chosen by using a catalyst which comprises a compound of a Group VIII metal, such as palladium, cobalt and nickel, an anion of a non-hydrohalogenic acid having a $pK_a$ of less than about six and an appropriate polydentate ligand, such as a bidentate ligand of the type shown in U.S. Pat. Nos. 4,818,810 and 4,843,144, for example, which is incorporated herein by reference.

After the polyketone which is impregnated with diluent and catalyst has been formed, as described previously, the polymerization is continued (e.g., at temperatures of from about 40° C. to about 120° C.) under substantially gas phase conditions as described in the aforesaid PCT International patent application and U.S. Ser. No. 96,754 U.S. Pat. No. 5,331.083.

The aforementioned U.S. Pat. No. 4,778,876 is incorporated herein by reference, generally in regard to the latter stage of the instant process, for its generalized teaching of how polyketones can be formed by vapor phase polymerization processes especially in regard to the types of monomers which can be used and the types of catalysts which can be utilized. As indicated before, polymers of carbon monoxide and an olefin, such as ethylene, propylene or combinations of ethylene and propylene is an area of known expertise.

In the vapor phase process shown in U.S. Pat. No. 4,778,876, it is taught that the monomers need to be contacted with the catalyst composition in the substantial absence of a liquid non-polymerizable diluent such as a monohydric alcohol having from one to four carbon atoms. In accordance with the latter stage of the process of the present invention, however, as earlier indicated, the polyketone product is formed using a predominantly vapor phase polymerization process of the general type set forth in U.S. Pat. No. 4,778,876 utilizing a supported catalyst with the support being substantially saturated with a liquid, non-polymerizable diluent. In general terms, the amount that is allowed to remain and saturate the support should not be so large as to produce a visually identifiable amount of free liquid so as to qualify the polymerization reaction as a solution or suspension polymerization reaction. In other words, if one compares the entire amount of diluent in the reaction system to the amount adsorbed by the support, one would realize that, preferably, essentially all the liquid diluent is adsorbed by the growing support during the course of the reaction rather than being present as free, non-adsorbed diluent. If one were to terminate the reaction at the transition point from the solution (or, during its latter stages, slurry) polymerization to the vapor phase polymerization and measure the amount of diluent adsorbed by the polymer support that was formed during the solution (slurry) polymerization portion of the overall process, one would determine a 50% to 400% add-on of weight to the support due to the diluent, preferably 100% to 200%.

The type of solvent which is to be allowed to remain in the amounts disclosed herein should be those which are capable of coordinating to a metal. Especially preferred are those solvents containing an oxygen or nitrogen atom (or both) so as to be capable of coordinating to the metal via the unbonded electrons on the oxygen and/or nitrogen atom(s), for example, therein. Examples of suitable organic solvents include acetonitrile, such ketones as acetone, such carboxylic acids as acetic acid, and such alcohols as methanol. Compatible mixtures of these can be used. Solvents containing phosphorus or sulfur atoms are also contemplated for use.

The catalyst to be used is in contact with a high surface area polyketone support (e.g., carbon monoxideethylene). As earlier mentioned, the general types of monomers and catalyst described in U.S. Pat. No. 4,778,876 can be used in accordance with the present invention.

Since the present process is a high activity polymerization procedure, vigorous stirring is needed to prevent setting up or clumping up of polymer particle product within the reactor.

In one embodiment of the present invention, it has been found that hydrogen gas can be added to the polymerization medium to produce a more thermally stable product having a higher bulk density and a reduced molecular weight. The hydrogen gas is preferably added at the very beginning of the polymerization to insure a uniform product batch. Hydrogen gas will produce a polyketone product having a much higher proportion of less reactive alkyl end groups and a correspondingly lower amount of more reactive vinyl, ester, alkoxy, or acid end groups.

The present invention is further illustrated by the Example which follows.

EXAMPLE 1

The catalyst preparation is a modification of the process shown in European Patent Publication No. 301,664, Example 3. The catalyst for the instant reaction was prepared as follows: 0.11 g $Pd(OAc)_2$, 0.23 g p-TsOH, and 0.24 g $Ph_2PCH_2CH_2CH_2PPh_2$ were placed in a flask with a stir bar. To this was added 20 ml of dry acetone and 14 ml of dry acetonitrile. The mixture was then stirred for ten minutes at room temperature then warmed to 50° C. for five minutes. This resulted in a clear yellow solution. The solution was cooled to 30° C., and the solvent was removed under vacuum. The product was a yellow solid.

The catalyst was dissolved in 1 liter of methanol, and the mixture was placed in a 20 liter autoclave. The stirrer was turned on and then the autoclave was heated to 65° C. while at the same time a 1:1 mixture of carbon monoxide and ethylene was introduced until the pressure was 80 bar at 65° C. These conditions were maintained for three hours. After this time the temperature was increased to 75° C. These conditions were then maintained for an additional seventeen hours. The pressure was then released and the autoclave cooled to room temperature. The product was scooped out. The product weighed 1.9 kg and had a LVN (100° C. in m-cresol) of 4.5.

The foregoing Example is being provided for illustrative purposes only and should not be construed in a limiting sense. The scope of protection which is sought is set forth in the claims which follow.

We claim:

1. In a process for catalytically polymerizing carbon monoxide and at least one olefinically unsaturated hydrocarbon in the gas phase in the presence of a polyketone catalyst support which is substantially saturated with an amount of a liquid, non-polymerizable diluent, which is effective in increasing the amount of polyketone formed, to form a polyketone, wherein the improvement comprises forming the saturated catalyst support in a previous solution polymerization step by polymerizing carbon monoxide and an olefin in a diluent comprising catalyst to form polyketone product in said catalyst-containing diluent which adsorbs substantially all of the diluent thereby producing, in a vapor phase reaction medium, the saturated polyketone catalyst support for such polymerization in the gas phase.

2. A process as claimed in claim 1 wherein the diluent is acetone.

3. A process as claimed in claim 1 wherein hydrogen is added to reduce the molecular weight and increase the bulk density and thermal stability of the polyketone.

4. A process as claimed in claim 3 wherein the hydrogen is added at the beginning of the solution polymerization step.

* * * * *